Jan. 6, 1942.  J. J. BACON  2,269,352
WOODCUTTING MACHINE
Filed May 2, 1939   3 Sheets-Sheet 1
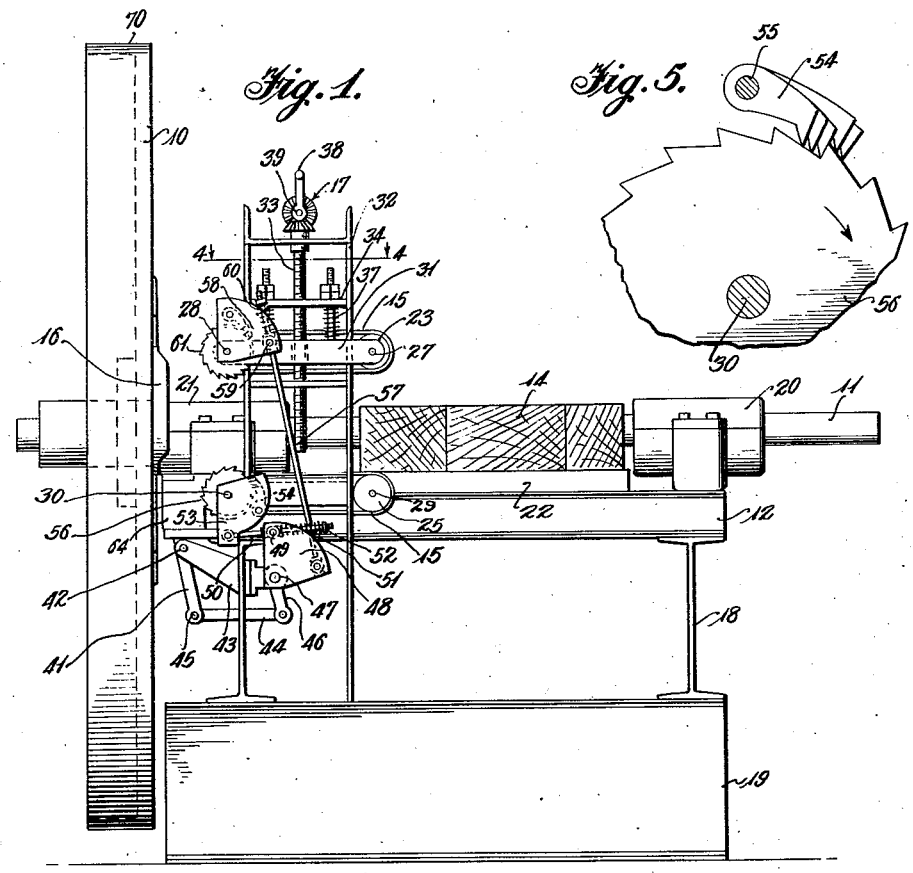
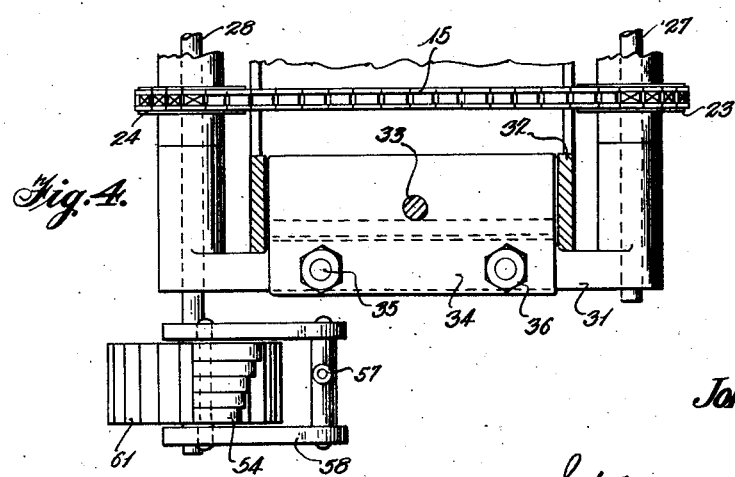
Inventor
John J. Bacon
By Stevens and Davis
Attorneys Jan. 6, 1942.    J. J. BACON    2,269,352
WOODCUTTING MACHINE
Filed May 2, 1939    3 Sheets-Sheet 2
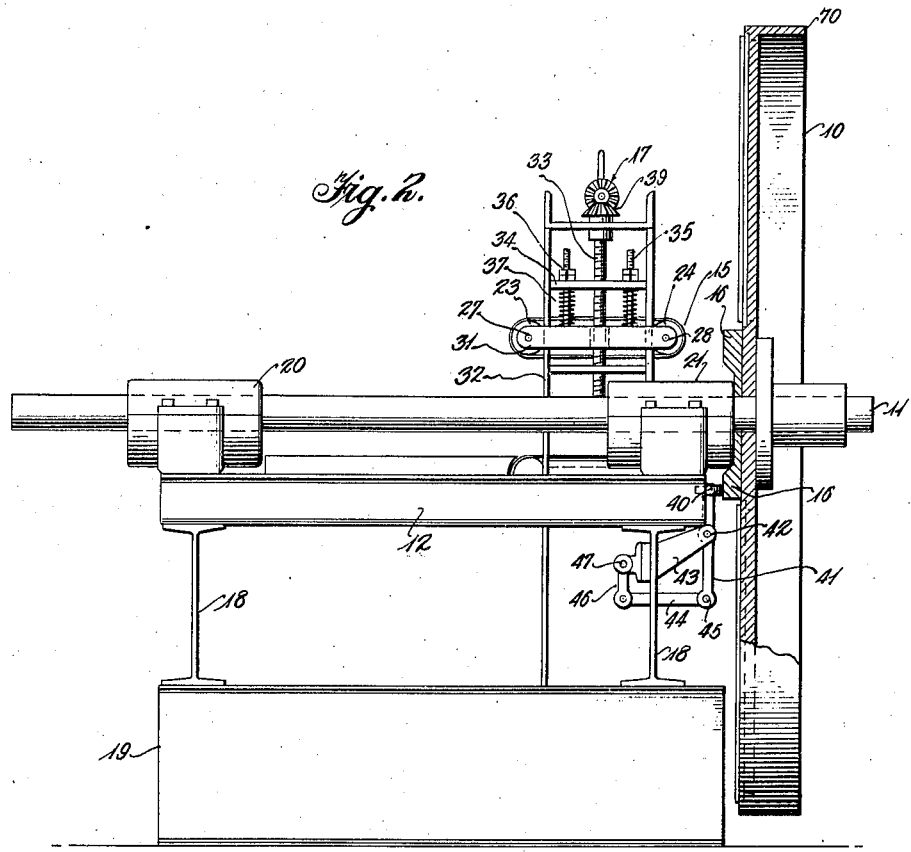
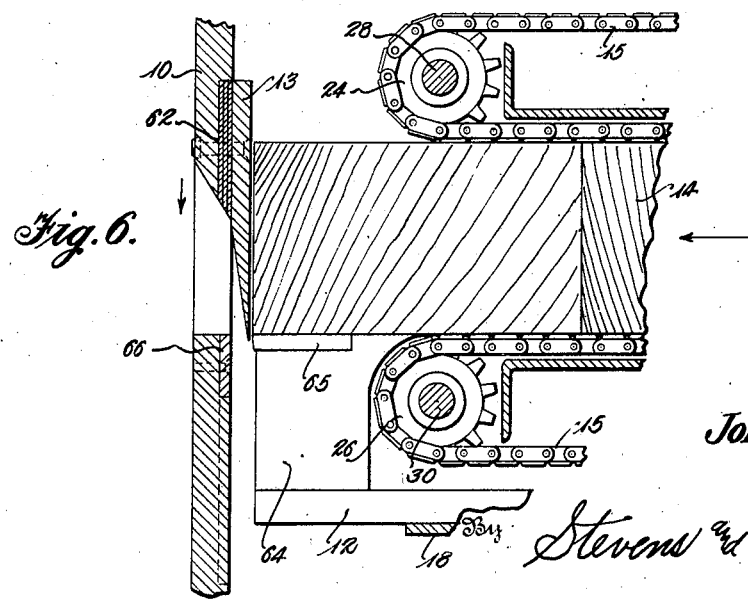
Inventor
John J. Bacon
By Stevens and Davis
Attorneys Jan. 6, 1942. J. J. BACON 2,269,352
WOODCUTTING MACHINE
Filed May 2, 1939 3 Sheets-Sheet 3

Inventor
John J. Bacon
By Stevens & Davis
Attorneys

Patented Jan. 6, 1942

2,269,352

UNITED STATES PATENT OFFICE 2,269,352

WOODCUTTING MACHINE

John J. Bacon, Gasport, N. Y.

Application May 2, 1939, Serial No. 271,338

3 Claims. (Cl. 144—176)

This invention relates to machines for cutting strips or slats from blocks of wood or other material and more particularly to such a machine of the rotating disc type with automatic feed features adaptable for use in connection with material of varying thicknesses for the production of slats suitable for use in making fruit crates and the like.

In modern fruit packing practice large quantities of wooden crates, boxes, baskets and the like are used. In order that the baskets, crates, etc., shall have a good appearance and furnish substantial protection for the materials packed therein it is necessary that the slats or strips of wood from which the packages are prepared shall be relatively smooth-surfaced, strong and rigid. Present methods of cutting such materials contemplate sawing and planing, rotary cut veneers or veneers cut by a radially positioned blade carried on a rotating disc.

The sawing and planing method wastes nearly half of the raw material in the loss of sawdust and shavings thus increasing the cost of operations.

The rotary cut veneers require the best quality timber and when such veneers are stored there is considerable difficulty arising from excessive shrinkage and swelling of the material. When the material is dried so that it will not mildew when placed in fruit and vegetable storages, it will swell or "wash-board" in such a manner as to make it undesirable. The sawed or sliced stock being cut across the grain does not ordinarily swell to an extent commensurate to rotary cut stock and so is more desirable for use in fruit receptacles where the fruit is to be kept in a more or less damp storage, but because of the waste of material this method is disadvantageous.

In the cutting of slats or strips by the use of radially positioned blades on a rotating cutting head, the disadvantages of the sawing and planing or rotary cut methods have been lessened but it will be seen that this method, too, involves a cut parallel to the grain and so results in disadvantages such as a rough surface more or less susceptible to splintering.

Another major disadvantage encountered in connection with the use of rotary cutting heads is that the lower edge of the strip, that is the edge at which the knife leaves the block, tends to become splintered or slivered to such an extent as to render the same difficult to handle in the manufacture of baskets and crates and potentially dangerous due to the fact that the user may become injured by the penetration into his flesh of such a sliver. The means which are provided by this invention for overcoming this difficulty is a block of hard metal disposed at the end of the feed table nearest the cutting head and against which the shearing knives of the head make contact in completing the cutting of a strip.

By overcoming the above difficulties it is found that there is produced a slat or strip of uniformly good characteristics having a smooth surface quite resistant to absorption of moisture and having clean, splinter-free edges. There is, however, no machine known to the art prior to the present invention which includes feed means capable of continuously presenting wooden blocks to the cutter head in such a manner that the whole of each of such blocks will be formed into suitable slats or strips. A suitable continuous feed mechanism is provided as an important part of this invention whereby wooden blocks are continuously fed into the machine by hand or any suitable feeding mechanism to be engaged by the feeding device provided and continuously presented to the cutter head at a rate which is determined solely by the rate at which the slats or strips are cut and which automatically adjusts itself to the size of each individual block being handled.

Briefly, the invention contemplates a rotary cutting head carrying slat cutting knives, each of which is mounted at an angle to that radius of the head which passes through the center of the blade to insure that the strip will be severed from the block by a shearing action; a shear block upon which the edge of the block being cut rests and which makes positive shearing contact with each cutting knife in turn to prevent slivering of the strips; and a continuous feed device of a nature which automatically adjusts itself to minor inequalities in the thickness of the blocks being fed to the cutting head.

By the use of the machine of the present invention a superior product will be produced more economically, more quickly and with a minimum of wear on the machine itself.

It is an object of the present invention to provide a slat cutting machine of the rotatable disc type having an automatic feed which will produce slats of uniform thickness which are substantially free from slivers or other objectionable characteristics heretofore deemed unavoidable.

In addition to the advantages of the present invention in the production of a superior finished strip, by the employment of the present machine the waste of material heretofore incident to either sawing or planing methods is avoided and at the same time the advantages incident to such methods are retained in that the cut is not made by a cutting device acting parallel to the grain of the block. In the production of slats by the use of the machine here under consideration speeds of operation heretofore unobtainable have been reached. These speed advantages arise from first, the rigidity of structure which permits the rotation of the disc at high peripheral speeds; second, an automatic feeding mechanism synchronized with the rotation of the disc and automatically adjustable irrespective of the thickness of the cut desired and third an easy adjustment of the feeding mechanism to accommodate blocks of varying thickness.

Another object of the present invention is to provide means for protecting those portions of the machine subjected to the greatest wear and to make such protecting means readily replaceable so that maintenance expense can be reduced to a minimum.

Other objects and advantages of the invention will be apparent from a consideration of the following detailed description of a preferred embodiment of the present invention when taken in conjunction with the annexed drawings in which:

Figure 1 is a side elevation of a machine made in accordance with the invention, showing the details of the preferred feeding mechanism;

Figure 2 is a side elevation of the machine, partially in section and omitting portions of the feeding mechanism;

Figure 4 is a detailed plan view taken along the line 4—4 of Figure 1;

Figure 5 is a detailed view of the ratchet wheel and pawls forming part of the feed mechanism;

Figure 6 is a detailed view partially in section showing means for adjusting the blade for cutting slats of varying thickness.

Figure 3:
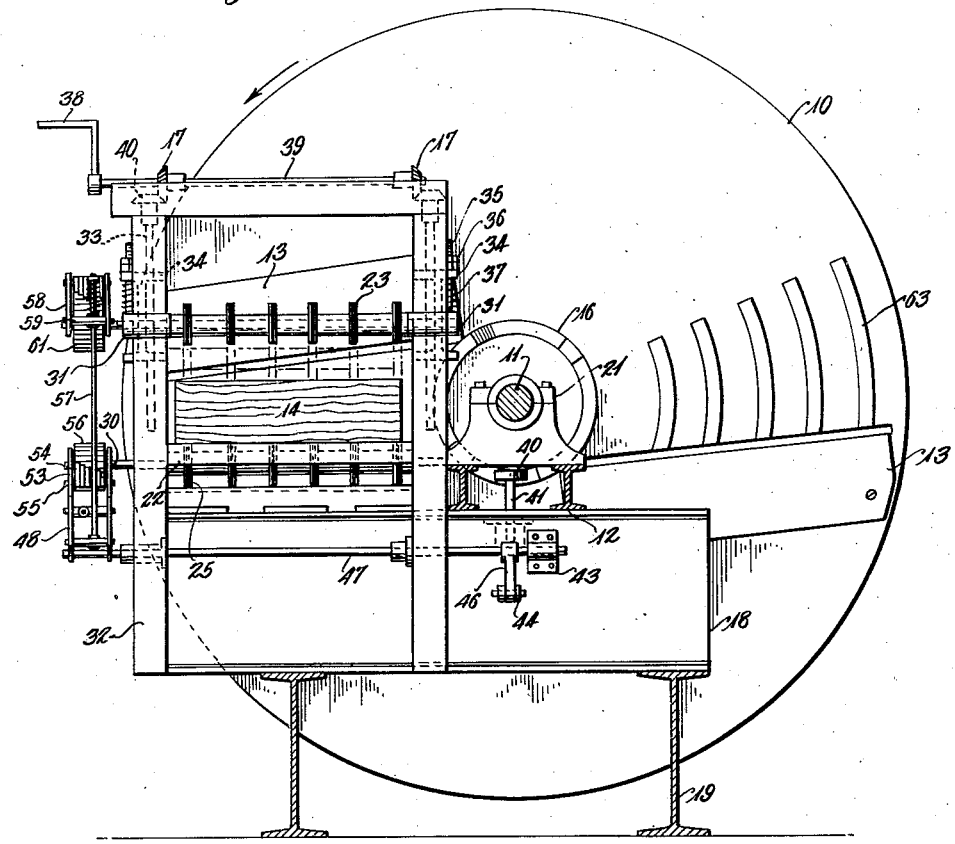
Figure 3 is a cross-section of the machine taken directly back of the feed mechanism showing in dotted lines the adjustment thereof.

Referring to the drawings in greater detail and more particularly to Figures 1 to 3 thereof, a disc 10 is provided keyed to and driven by a shaft 11 suitably supported at 12 and which may be actuated from a belt passed over the periphery thereof. Mounted on disc 10 adjacent generally rectangular openings therein are blades 13 adapted for the cutting of the blocks 14. Such blocks 14 are manually supplied to feeding chains 15 actuated through a linkage, hereinafter described, by cam surface 16 on the disc 10. By rotation of adjustment gears 17, the upper feed chains 15 may be raised or lowered to accommodate blocks 14 of varying thickness. The chains 15 then receive therebetween the blocks 14 and move the same forward to be cut by blade 13.

The supports 12 are maintained in position by suitable I-beams 18 and 19 which may be of varying height depending upon the desired length of blades 13 and consequently the diameter of the disc 10. Suitably mounted on the beams 12 are bearings 20 and 21 which receive the shaft 11. The blocks from which the slats are to be cut are placed on a suitable support 22 and are manually urged in the direction of the disc 10 until they are received between the said chains 15. The feed chains 15 may be of any suitable number to accommodate the length of the block being fed into the cutting disc 10. As illustrated in Figure 3, twelve such chains are provided, constituting a suitable number for a blade of two feet in length. The feed chains 15 are arranged in two banks, one of which is superimposed with respect to the other and they are in engagement with sprockets 23, 24, 25 and 26 keyed respectively to shafts 27, 28, 29 and 30.

The shafts 27 and 28 are mounted for rotation in generally U-shaped supports 31 which comprise bearings for such shafts. The shafts 29 and 30 are similarly mounted within stationary brace 32 which is secured to I-beam 18. The supports 31 are mounted for reciprocation on brace 32 and are constructed in generally U-shape to prevent interference with the screws 33 as shown in Figure 4. Also mounted for reciprocation on brace 32 are supports 34 which threadedly receive the screws 33 and are movable thereby. The support 31 is suspended from support 34 through bolts 35, the weight being supported by nuts 36. Springs 37 are interposed intermediate supports 31 and supports 34 so that the former will be constantly resiliently urged toward the top surface of the blocks 14. Screws 33 are operable by means of a crank 38 which actuates shaft 39 to which are keyed bevel gears 17 engaging bevel gears 40 which are in turn keyed to shafts 33. The tension of springs 37 is adjustable by turning nuts 36 and the springs are provided to resiliently maintain the chains 15 carried by supports 31 in engagement with the top surface of the block 14. This resilience will constitute a compensation for minor variations in thickness of blocks after the major adjustment of the upper chains 15 has been made to accommodate blocks of a given general thickness.

When the blocks 14 are received between the chains 15 they are carried forward by the motion of such chains which is caused by the movement of a linkage by the cam surface 16 on the disc 10. When the disc 10 rotates it will be noted that cams 16 will strike roller 40 which is fastened at the end of link 41. Link 41 is movable about an axis 42 at which point it is rotatably supported by stationary plate 43 permanently fastened to support 18. As link 41 oscillates in response to the action of cam 16, link 44 fastened thereto at point 45 will be caused to reciprocate. This reciprocation is imparted to rod 46 which is keyed to shaft 47 to which is also keyed segment 48, thus causing the segment to oscillate. Bearing surfaces for the shaft 47 are provided at 43 and in stationary brace 32. The segment 48 has rotatably fitted therein a rod 49 through which is passed a rod 50 in a manner such that rod 50 slides freely through an opening in rod 49 intermediate the ends thereof. Between the rod 49 and one end of the rod 50, a spring 51 is provided, such spring being compressed by the action of nut 52. At the other end of the rod 50 a segment 53 is provided which segment is rotatably mounted on shaft 30. Suitably mounted near the periphery of the segment 53 are a plurality of pawls 54 mounted for rotation on shaft 55. These pawls are for use in conjunction with ratchet wheel 56 keyed to shaft 30. Consequently any motion imparted to segment 53 will be transmitted through pawls 54 to the ratchet wheel 56 and thus to the shaft 30.

With respect to the upper set of sprockets 23 and 24 carried on shafts 27 and 28 a similar linkage is provided. In this instance a shaft 57, corresponding in function to shaft 50, is also connected to segment 48. This shaft is slidably fastened to segment 58 and has provided intermediate its end and the fastening point 59 a spring 60 corresponding in function to spring 51. The segment 58 acts on the ratchet wheel 61 in the same manner as the segment 53 on the sprocket 56 namely through a series of pawls. It will be noted that when the screw 33 is actuated to move the upper feed chains 15 into engagement with the blocks, the segment 58 being freely rotatable about the shaft 28 will move about its axis but will not vary from its functional relationship insofar as the pawls carried thereby are concerned. It will be observed that the pawls acting on ratchet wheel 61 operate in the opposite direction from those acting upon ratchet wheel 56, so that sprockets 24—26 will be driven to cause the runs of the chains which contact the blocks to move in a direction toward the rotating disc 10.

A plurality of pawls 54 are provided to cooperate with both ratchet wheels 56 and 61 so that the feed will be constant irrespective of the amount of cut taken at any given stroke of the knife. See particularly Figure 5. Minor variations are taken up by the springs 51 and 60 which also function to maintain the blocks resiliently against the disc 10.

With respect to the cutting operation it should be noted that the blade 13 is securely fastened to the disc 10 and that between such blade and the disc a number of shims 62 may be placed to vary the amount of cutting accomplished by the blade at any given stroke thereof. It will be seen that this is the only adjustment necessary to vary the cutting, the feeding mechanism being automatically adjustable by virtue of the plurality of pawls 54, and the springs 51 and 60 which always hold the block tight against the cutting head 10. The multiple arrangement of the pawls 54 is provided so that one pair of pawls will always contact without loss of motion.

Figure 7:
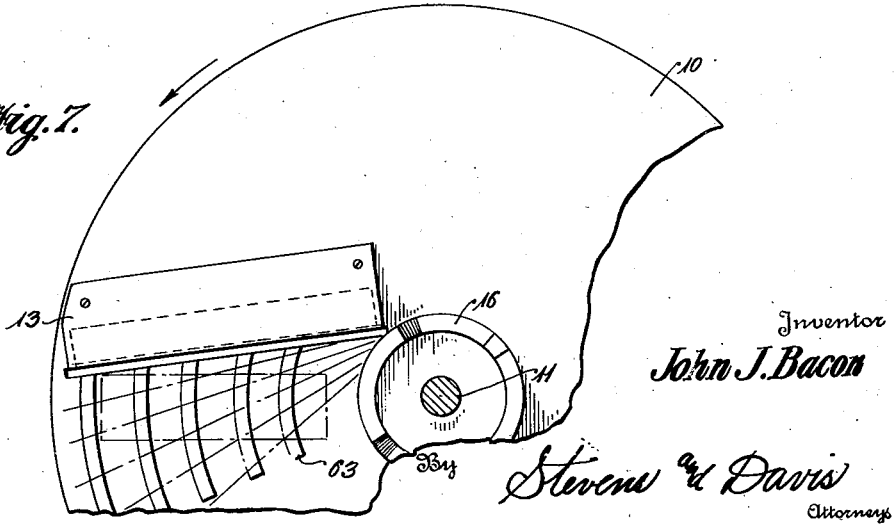
Figure 7 is a front elevation of the disc partially broken away illustrating the position of the blade with respect to a radius of the disc.

The position of the blade as illustrated in Figure 7 is such that the normal rotation of the disc will cause the cut to be in the nature of a shearing. This is of considerable importance since it obviates the parallel cut of the prior art machines which has been found injurious to the grain of the wood. Mounted on the disc 10 just ahead of the blade 13 are a series of wear resistant surfaces 63 against which the block will be urged by the feeding mechanism. These surfaces are readily replaceable and are of assistance in maintaining the surface of the disc itself in good condition over long periods of operation. The importance of the members 63 will be clear when it is considered that any wear on the disc 10 will tend to unbalance the same and cause variations in the thickness of cut. Referring particularly to Figure 1, it will be seen that the disc is provided with a peripheral flange 70 which acts as a stiffening member and may also receive a belt for a peripheral drive.

Referring particularly to Figure 6 of the drawings, it will be noted that a support 64 is provided intermediate the sprockets 26 and the surface of disc 10. This support which is suitably fastened to beams 12 has a shear bar 65 against which the blades 13 shear the last of the cut. Because of the extension of shear bar 65 slightly beyond the edge of support 64, splintering is substantially avoided. Just below the blade opening in the disc 10 a removable pressure bar 66 is provided. This bar has been found to guide the lumber to the blade in a manner to secure a more accurate splinter free cut.

The operation of the device is as follows. A number of blocks 14 are placed over the lower feed chains 15 and by suitable adjustment of screw 33 upper feed chains 15 are placed in engagement with the upper surface of the blocks. These chains are resiliently maintained in position by the action of springs 37. The device is then set into motion causing the disc 10 to rotate. The speed of the machine will depend upon the diameter of the cutting head and for a four-foot diameter disc a speed of 250 R. P. M. is contemplated. As the diameter increases, the speed will be somewhat reduced so that a six-foot diameter disc will be run at about 150 R. P. M. As the disc rotates in the manner shown by the arrow in Figure 3 the linkage 41, 44, 46 will cause the segment 48 to move about its axis 47. This action will bring about the reciprocation of rods 50 and 57 which in turn will rock segments 53 and 58 about their axes on shafts 28 and 31. As the segments are oscillated the pawls 54 will engage their respective ratchets causing the shafts 28 and 31 to rotate thus actuating the sprockets 34 and 26 to drive chains 15 thus feeding the blocks into the cutting mechanism.

As has been said before, the depth of the cut may be adjusted by inserting any desirable number of shims 62 between the disc 10 and the blade 13. Such an adjustment will not affect the constant feed of blocks 14 through the runs of chains 15. It will be noted that in the event there is a very narrow cut taken such that it is not necessary to feed a full notch in the ratchet wheels 56—61 for every given stroke, the reciprocation of the rods 50—57 will merely compress springs 51—60, thus resiliently maintaining the block constant against the surface of the disc 10. Of course, amounts of wood less than that represented by a single notch in the ratchet wheel may be fed because of the provision of a plurality of pawls 54.

As the blocks 14 are forced against the surface of disc 10 they are contacted by members 63. One of the blades 13 then cuts across the block as shown by the lines in Figure 7, the slat thus produced being ejected through the opening in disc 10.

Although the above description has reference to a specific embodiment of the invention, it will be apparent that many modifications thereof are possible. The invention, therefore, is not to be restricted except insofar as is necessitated by the prior art and by the spirit of the appended claims.

What is claimed is:

1. A machine for cutting slats from wooden blocks comprising a disc having an adjustable blade and cam surfaces thereon, means for feeding said blocks to said disc, said means clamping said blocks therebetween, a ratchet wheel for actuating said feeding means, a plurality of pawls of varying length operable upon said ratchet wheel and means responsive to the action of said cams for actuating said pawls, resilient means interposed between said cam responsive means and said pawls, and means to rotate said disc.

2. A machine for cutting slices from wooden blocks and the like comprising, a driven disc having a blade thereon in shearing position, upper and lower endless conveyors for clamping a block therebetween and feeding the same to the blade, said conveyors running at right angles to the surface of the disc, a vertically movable member, a screw acting upon said member for vertically moving the same, a support for the upper conveyor, said support being suspended from said vertically movable member, resilient means interposed between said conveyor support and said vertically movable member, a cam on the disc, means operable by said cam to actuate intermittently in unison said conveyors, a portion of said means being permanently attached and movable with said upper conveyor to drive the same in any adjusted position.

3. A machine for cutting slices from wooden blocks and the like comprising, a driven disc having a blade thereon in shearing position, means for adjusting the amount of cut of the blade, upper and lower endless conveyors for clamping a block therebetween and feeding the same to the blade, means for vertically adjusting one of said conveyors to accommodate blocks of different thicknesses, a cam on the disc, means operable by said cam to actuate intermittently in unison said conveyors, automatic means constituting a part of said cam-operated means for varying the amplitude of movement of said conveyors proportional to the amount of cut of the blade, a portion of said cam-operated means being movable with the vertically adjustable conveyor to drive the same in any adjusted position.

JOHN J. BACON.